United States Patent [19]

Isaak et al.

[11] 4,203,164

[45] May 13, 1980

[54] SECURE SONAR COMMUNICATION SYSTEM

[75] Inventors: Robert D. Isaak; William E. Klund; Woodrow H. Littrell, all of San Diego; Richard G. Stephenson, Rolling Hills, all of Calif.

[73] Assignee: The United States of America as represented by the Secretary of the Navy, Washington, D.C.

[21] Appl. No.: 93,811

[22] Filed: Mar. 6, 1961

[51] Int. Cl.² ............................................... H04B 11/00
[52] U.S. Cl. .................................... 367/134; 367/125; 367/904; 343/100 CL
[58] Field of Search ...................... 250/6.5, 6.6; 340/4, 340/5, 3, 6, 5 R, 6 R; 325/32, 33, 34, 122; 179/1.5; 343/100.7

[56] References Cited

U.S. PATENT DOCUMENTS

| | | | |
|---|---|---|---|
| 2,253,975 | 8/1941 | Guanella | 340/3 |
| 2,423,546 | 7/1947 | Bedford | 343/100 CL X |
| 2,798,902 | 7/1957 | Kursman et al. | 340/5 |
| 2,958,039 | 10/1960 | Anderson | 343/100 CL X |
| 3,016,519 | 1/1962 | Linder | 343/100 CL X |
| 3,022,486 | 2/1962 | Gettys et al. | 340/3 |

*Primary Examiner*—Richard A. Farley
*Attorney, Agent, or Firm*—Paul N. Critchlow

EXEMPLARY CLAIM

A secure sonar communication system for transmitting and receiving intelligence signals within an aqueous medium comprising in combination means for generating an electrical pseudo random noise signal within a predetermined bandwidth, means connected to said pseudo random noise generating means for selectively driving same at one of a plurality of predetermined frequencies, keying oscillator means adapted to selectively produce an output of one of a plurality of predetermined frequency signals, a balanced modulator means coupled to said pseudo random noise signal generating means and said keying oscillator means for mixing the output signals therefrom, bandpass filter means connected to the output of said balanced modulator means for passing the upper sideband thereof, means for receiving an electrical pseudo random noise signal, transducer means, said transducer means being capable of broadcasting acoustical energy upon excitation by the upper sideband from the aforesaid bandpass filter means and in proportion thereto and for producing an electrical pseudo random noise output signal in proportion to a received acoustical pseudo random noise signal, and means connected to the output of said bandpass filter means and the input of said electrical pseudo random noise signal receiving means for selectively connecting same to said transducer means during broadcasting and receiving operations respectively.

11 Claims, 4 Drawing Figures

SECURE SONAR COMMUNICATION SYSTEM

The invention described herein may be manufactured and used by or for the Government of the United States of America for Governmental purposes without the payment of any royalties thereon or therefor.

The present invention relates generally to underwater communication and sonar systems and particularly concerns means for communicating with, identifying as friend or foe, and measuring the position of submerged submarines at long range distances while affording optimum security from detection by an enemy sonar system.

While use of underwater sound and detection systems are not new as a means for communicating between marine and submarine vehicles, their limitations are well known and in many instances very disconcerting. For example, the underwater telephone was limited to a transmission range of approximately 10,000 yards, echo-ranging sonars had a maximum effective range of 2000 to 3000 yards, and passive detection of cavitating vehicles was only successful as far as 10,000 to 20,000 yards. In addition, such systems were extremely susceptible to enemy detection and their data transmission rate was slow and often resulted in obtaining inaccurate information.

Although the systems of the prior art mentioned above and the subject invention both propagate acoustical energy through an aqueous medium for communication purposes, their similarity ends there. The present invention, for instance, enables messages and data to be exchanged between submerged submarines separated by distances as great as two hundred miles. Furthermore, in the process of establishing communication, the range distances and bearing between submarines may be measured and displayed with an accuracy limited only by the knowledge of the speed of sound in the operating area. Detection security is feasible through techniques utilizing a relatively low source spectrum level made possible by broadband signal projection, a highly directional receiving hydrophone and transducer array, and the processing gain derived by cross-correlation of the received signal with a local replica. Insonification of a minimum ocean area results from directional transmission and use of the oceanographic convergence zone phenomenon which, likewise, improves security from detection by other than the intended communication target vessel. The initial acquisition on the readout display itself constitutes positive friend or foe identification which, of course, provides considerable additional security. Also, since the signal transmission may be varied between a few seconds and a few minutes as necessary to meet given operational requirements, and inasmuch as the signal energy is noise-like in character and is distributed over approximately a one half octave frequency band, the probability of detection by the enemy is relatively small. Moreover, because a local time-varying replica is employed for the correlation process, a very high degree of cryptographic security is inherent.

It is, therefore, an object of this invention to provide an improved sonar system with exceedingly long range communication characteristics.

Still another object of this invention is to provide a sonar communication system which is not readily susceptible to enemy detection.

A further object of this invention is to provide a sonar communication system with an improved data transmission rate.

Another object of this invention is to provide a sonar system with improved intelligence processing, fidelity, and accuracy.

A further object of this invention is to provide a sonar communication system having an inherent high degree of cryptographic security.

Another object of this invention is to provide a means which may be utilized for accurately determining range between communicating vessels.

Still another object of this invention is to provide a means adapted to be employed in making bearing determinations relative to the communicating vessels.

Another object of this invention is to provide a means which may be used for ascertaining the range rate between communicating vessels.

A further object of this invention is to provide a means for automatically providing positive identification of another vessel as friend or foe at the time communication is established.

Another object of this invention is to provide and establish a base line between communicating vessels which may be employed in conjunction with conventional passive sonar equipment to facilitate target range and bearing determination by triangulation for fire control purposes.

Other objects and many of the attendant advantages of this invention will be readily appreciated as the same becomes better understood by reference to the following detailed description when considered in conjunction with the accompanying drawings wherein.

Although several secure sonar communication systems have been developed and constructed for evaluation purposes, it has been determined that the preferred embodiment disclosed herewith provides optimum performance. This embodiment was constructed for two-way communication using hull-mounted transducers and omnidirectional transducers which were lowered to the deep sound channel. It is noteworthy, however, that conventional passive detection transducer arrays may also be used for receiving purposes if so desired.

Figure 1:
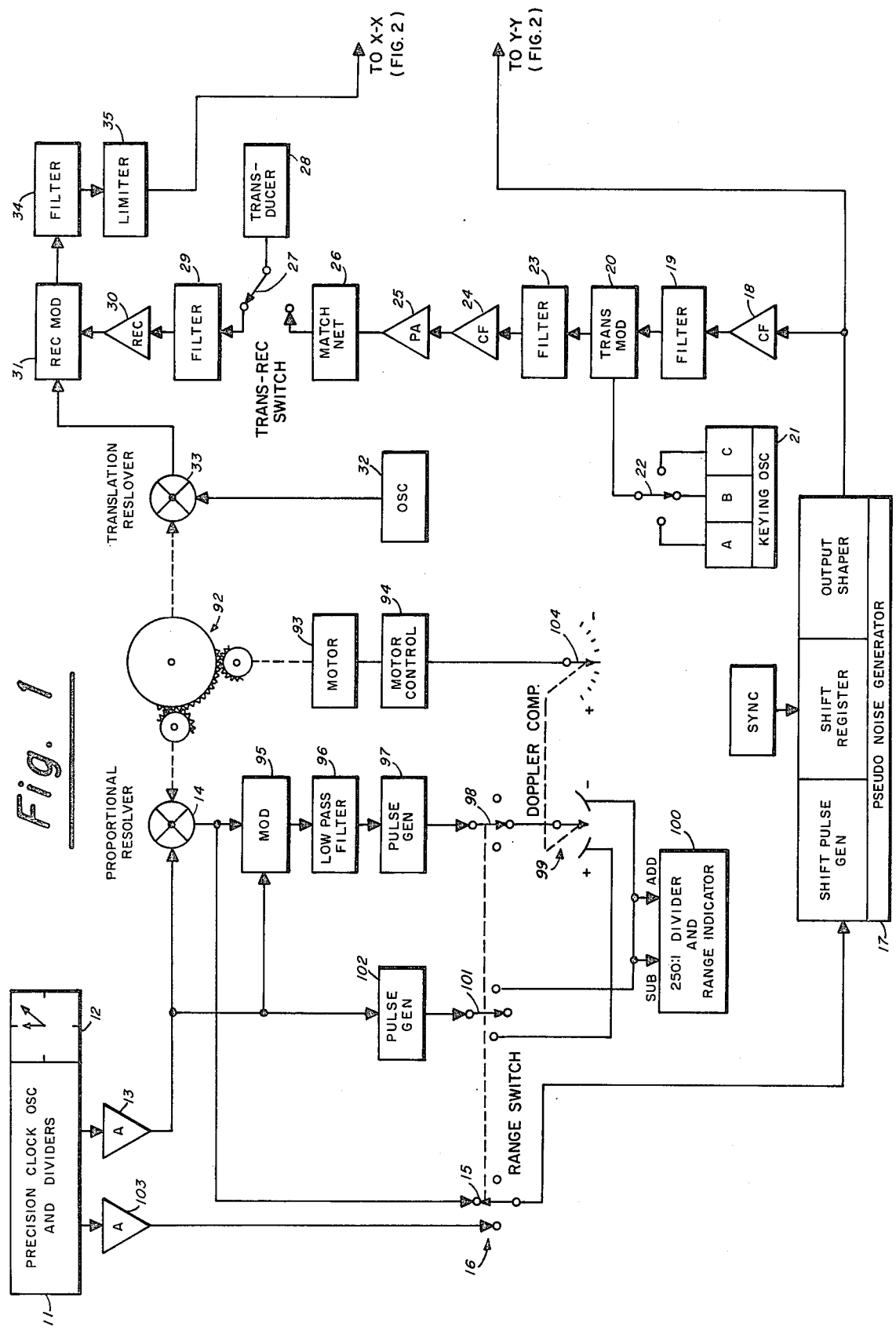
FIGS. 1 and 2 show a schematic block diagram of the device constituting this invention.
Figure 2:
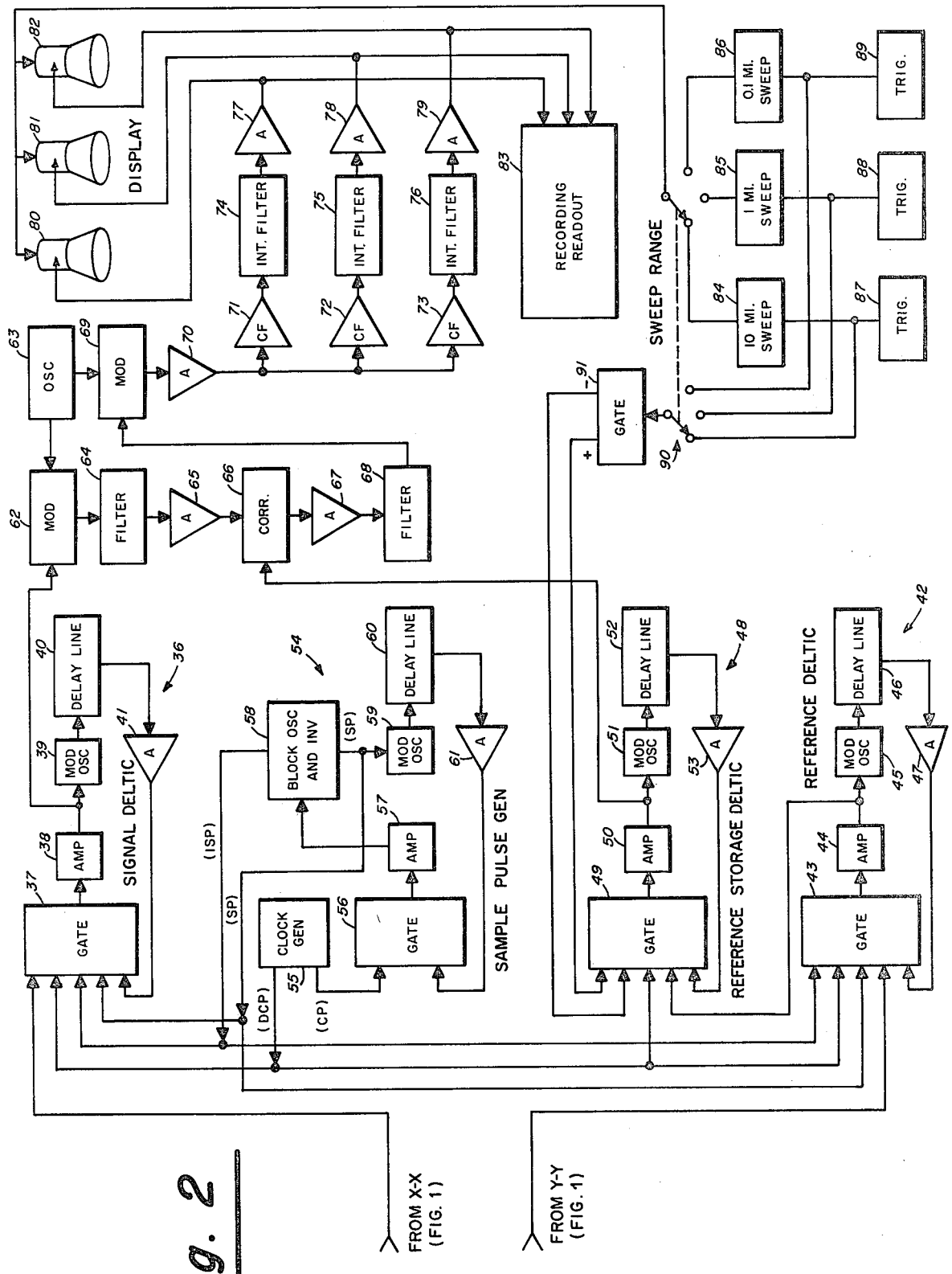

Referring now to FIGS. 1 and 2, taken together, a more detailed disclosure of the over-all concept is presented in block diagram form with the various and sundry blocks thereof representing conventional components except as further noted below. A precision master clock oscillator and dividers 11 is shown as a self-contained unit which provides accurate output signals of two kilocycles per second and four kilocycles per second and also contains a clock movement 12 to display the time of day. The 2 kc output is amplified by an amplifier 13, fed through a proportional resolver 14, and connected through contacts 15 of a range set switch 16 to control the shift pulse rate at a pseudo-noise generator 17. Normally, the proportional resolver does not alter the frequency of the signal fed through it. The pseudo-noise generator is driven at an accurately controlled rate, and it should be designed to provide a random period rectangular waveform having a continuous spectrum of constant amplitude between 0 and 1000 cycles per second with some higher frequency components.

The pseudo-noise generator output signal is fed through a circuit isolation cathode follower 18 to a low-pass filter 19 to eliminate the aforesaid higher frequency components. This filter should be designed to be slightly broader—say 0 to 1100 cycles per second for instance—than the bandwidth of the signal to be correlated so that the bandwidth of the signal in the water will not vary during message transmission. This filtered pseudo-noise signal provides one input to a transmitter modulator 20. The second input to transmitter modulator 20 is supplied by one of three keying oscillators 21, which are tuning fork oscillators operating at 1446, 1450, and 1454 cycles per second with accuracies of one part in ten thousand. For the purpose of clarity and future reference, they are respectively designated herein as oscillators A, B, and C. These keying oscillators are coupled to the transmitter modulator by a selector switch 22, which is keyed sequentially in order to convey intelligence during message transmission. If desired, a programer may be employed in conjunction with this switch in order to effect selection of the pertinent keying oscillator frequency in accordance with a predetermined program prepared on punched cards, magnetic tapes, memory drums, or the like. In addition, a fourth oscillator operating at 1442 cps may be used as a "break." This one would have no counterpart in the receiving system and so it would be used as a break in the coding without producing a distinguishable change in the transmitter output signal. Transmitter modulator 20 is a balanced modulator such that only the sum and difference frequencies resulting from the input signals appear at its output. A 1.5 to 2.5 kc bandpass filter 23 selects the upper sideband at the modulator output. Thus, it can be seen that the spectrum in this frequency band will be continuous for any of the three keying oscillator inputs. Although each frequency component of the pseudo-noise signal is translated by an amount determined by the keying oscillator frequency selected, the signal appearing at the output of bandpass filter 23 has a pseudo-random distribution over the pass band and the keying can be detected only when the output signal is compared with a second signal produced by an identical time series—a time series, incidentally, that can be produced only by a comparable secure sonar communication system located in the remote communicating vessel. It should be noted, however, that the remote receiving station, in addition to having a comparable communication system, is also obliged to know the correct code-of-the-day in order to generate the correct time series so that proper correlation may occur between communicating vessels.

The 1.5 to 2.5 kc output from the transmitter modulator is fed through a circuit isolation cathode follower 24 to a power amplifier 25 which employs an input limiting circuit. This power amplifier may, for example, include a pair of 4-125 power amplifier tubes which are driven by the constant amplitude output signal from the aforesaid limiter portion thereof. Since the power amplifier is normally biased below cutoff and is driven to peak power only by each positive excursion of the input signal, a relatively high efficiency results even when the input drive level is varied over a wide range.

The power amplifier output is coupled through a matching network 26 and the transmit contacts of a transmit receive selecter switch 27 to a transducer 28. If so desired, transducer 28 may comprise a unidirectional electroacoustical projector or a hydrophone array for transmitting and receiving energy at a direction in accordance with a predetermined radiation pattern. The matching network is designed to provide maximum power transfer for an approximately flat spectrum between 1.5 to and 2.5 kc at the transducer output and to present an essentially resistive load to the power amplifier.

When transducer 28 is connected to the receive contacts of selector switch 27, the output therefrom is fed to a filter 29 having 1.5 to 2.5 kc bandpass characteristics and then to a receiving amplifier 30. Since the subject secure sonar communication system works equally well for signal level variations at the receiving amplifier output of more than 30 db, simple automatic gain control of the receiving amplifier provides satisfactory operaion and, thus, manual gain adjustment is unnecessary.

The 1.5 to 2.5 kilocycle signal from the receiving amplifier provides one input to a doppler compensation apparatus of the type disclosed, for example, in copending Patent Office Ser. No. 93,814, filed Mar. 6, 1961, entitled Doppler Compensation for Heterodyne Correlation Devices by Robert D. Isaak, William E. Klund, and Woodrow H. Littrell, or any other suitable type having a receiver modulator of the balanced type. The second input thereto is supplied by a tuning fork oscillator 32 having a frequency of 1433.5±0.01 percent coupled through a translation resolver 33 which normally does not alter the frequency of this signal. The lower sideband at the receiver modulator output is selected by a one kilocycle low-pass filter 34, from which it is then fed to a limiter 35 which converts it back to a rectangular waveform of random period. The output from limiter 35 is coupled to a signal delay line time compressor, referred to herein as a deltic 36, such as, for example, the type covered by patent application Ser. No. 585,827, filed May 18, 1956, by Dr. Victor C. Anderson, now U.S. Pat. No. 2,958,039, entitled Delay Line Time Compressor. This deltic has a storage capacity of 1000 binary digits and actually samples the input information from limiter 35 every 500 microseconds and stores 999 samples. Each sample is stored for about one-half second and then replaced by a new sample. Meanwhile the past one-half second of information, comprised of the 999 samples, which has been compressed in time, is continuously presented at the deltic output at the rate of once each 499.5 microseconds, so that a time compression of 1000 to 1 with the corresponding multiplication of frequency and bandwidth is obtained. Thus, it can be seen that the deltic output represents a speeded up replica of the input provided that the sampling rate is sufficiently high. The deltic circuit employs an input coincidence gate 37, a pulse amplifier 38, a modulated oscillator 39 to convert the pulses to a 20 megacycle delay line carrier frequency, and a 499.5 microsecond acoustic delay line 40 with feedback through an amplifier 41 to the input coincidence gate. The coincidence gate acts as a single pole-double throw switch which normally permits the output of amplifier 41 to pass on to the pulse amplifier 38. However, it effectively switches the limiter 35 output into the pulse amplifier for 0.5 microseconds every 500 microseconds.

The output from pseudo-noise generator 17 is also applied to a reference deltic 42. This reference deltic is identical to the aforementioned signal deltic in that it includes a coincidence gate 43 which actually receives the pseudo-noise generator output as one of its input signals, a pulse amplifier 44 connected to the output of said coincidence gate, the output of which is, in turn, fed through a modulated oscillator 45 to a 499.5 microsecond acoustic delay line 46. Feedback from the acoustic delay line to coincidence gate 43 is accomplished through an amplifier 47. Coincident with the beginning of each sweep of the display units described more fully below, the entire information content of the reference deltic is transferred to a reference storage deltic 48 where this information recirculates and becomes available at the output each 500 microseconds.

Reference storage deltic 48 is practically identical with the signal and reference deltics with one exception. It includes a coincidence gate 49 as the input component with a pulse amplifier 50 coupled thereto. A modulated oscillator 51 is connected to receive the pulse amplifier output and a 500 microsecond acoustic delay line 52 coupled for response to the output of the modulated oscillator. Feedback is achieved through an amplifier 53 interconnecting the acoustic delay line and the coincidence gate. The exception mentioned above pertains to the delay time of the reference storage acoustic delay line which, as indicated is 0.5 microseconds longer than the signal and reference deltic delay lines, and, hence, it contains 1000 digits instead of 999. Instead of being continuously filled at a 2 kc bit rate, as is done in the aforementioned signal and reference deltics, reference storage deltic 48 is completely filled at a 2 megacycle rate in a 500 microsecond period at the start of the display sweep, and then this data recirculates without change until another display sweep is initiated.

In order to appropriately synchronize the operations of signal deltic 36, reference deltic 42 and reference storage deltic 48, pertinent pulses are supplied thereto by means of a sample pulse generator 54 of the type disclosed herein or of the type disclosed in co-pending if so desired, transducer 28 may comprise a unidirectional electroacoustical projector or a hydrophone array for transmitting and receiving energy at a direction in accordance with a predetermined radiation pattern. A clock generator 55 produces delayed clock pulses (DCP) at a rate of two megacycles per second which are applied to coincidence gates 37, 43, and 49 to reshape and resynchronize the signals which are being recirculated in the signal deltic, the reference deltic, and the reference storage, respectively. Clock generator 55 also produces clock pulses (CP) that are timely applied to a coincidence gate 56 of the sample pulse generator 50 which, in turn, provides an output signal that is amplified in an amplifier 57 and then applied to a blocking oscillator and invertor 58. In effect, sample pulse generator 54 constitutes a 2000 to one frequency divider and produces a sample pulse (SP) output signal and an inverted sample pulse (ISP) output simultaneously every five hundred microseconds. The sample pulse is applied to the coincidence gates of the aforementioned signal deltic and reference deltics to synchronize the operation thereof and gate new information in. The inverted sample pulse is likewise fed to the coincidence gates of the signal and reference deltics for timely inhibiting the operation thereof, as will be further explained subsequently. Furthermore, inasmuch as clock generator 55 and blocking oscillator and logical inverter 58 are not in this particular instance conventional per se, they, too, are described more fully below in conjunction with their respective drawing figures.

In order that the output from coincidence gate 56 is properly recirculated in the sample pulse generator, the sample pulse output signal from blocking oscillator and invertor 58 is fed through a modulator oscillator 59, a 500 microsecond acoustic delay line 60, and an amplifier 61 back to the appropriate input of said gate 56.

Because of the small but precise difference in repetition periods of the signals at the reference storage and signal deltic outputs, these two signals precess with respect to one another at the rate of one digit each 500 microseconds. If these two signals are cross-correlated, assuming an initial delay of the received signal, an output will result when the recirculating signal in the reference storge has been delayed an equal amount. Because the rate of precession is the reciprocal of the time compression ratio of the signal and reference deltics, the scanning of the received signal is accomplished in real time.

In the herein disclosed preferred embodiment, the output from signal deltic 36 is applied to a modulator 62 where it is heterodyned upward in frequency with a 1000 kilocycles per second signal from an oscillator 63, passed through a 1050 to 2000 kc band pass filter 64, amplified by an amplifier 65, and coupled as one of the inputs to a correlator 66. The output from reference storage 48 is likewise applied to correlation 66. In essence, correlator 66 consists of a balanced modulator, and its output contains frequencies of 1012.5 kc, 1016.5, kc, or 1020.5 kc corresponding to the selection, at the transmitter, of oscillators A, B, or C, respectively, at keying oscillator 21. The correlator 66 output also contains an unwanted sideband covering an approximate frequency band of 1000 kc to 3000 kc.

The output of correlator 66 is further amplified by an amplifier 67 and passed through a bandpass filter 68 to remove the unwanted sideband and then to a second modulator 69 where it is heterodyned downward in frequency by 1000 kc as a result of the local oscillator 63 input of 1000 kc. The output signals from modulator 69 have frequencies which correspond to the keying oscillator frequencies of 12.5 kc, 16.5 kc, or 20.5 kc in accordance with selected A, B, or C frequencies, respectively.

The double heterodyning function is associated with the aforesaid correlation circuit to improve performance when the signal input level at the correlator is small compared to the background noise. The spectrum of the desired signal at the signal deltic output is essentially 0 to 1000 kilocycles per second, and it may be corrupted by background noise components in the same frequency band as a result of the transmsision through sea water. If double heterodyning were not used, the correlation of this background noise with the 0 to 1000 kc reference signal would produce difference frequencies having a triangular amplitude versus frequency distribution centered at zero frequency and extending 1000 kc in each direction along the frequency axis. Due to spectrum folding about zero frequency, the noise contribution in the 0 to 1000 kc band is thereby doubled. But with the use of double heterordyning, the signal spectrum containing the noise components is translated upward by 1000 kc before multiplication in the correlator's balanced modulator. Hence, the difference frequency components are then centered at 100 kc and no spectrum folding occurs. The integration filters therefore separate the signals from the background noise rather than separating the signals from twice the background noise.

The output from modulator 69 is amplified by an amplifier 70 and respectively fed through cathode follower isolation circuits 71, 72, and 73 to parallel bandpass integration filters 74, 75, and 76 with center frequencies corresponding to that of the aforementioned characters A, B, and C and bandwidths of 100 cycles per second.

While the integration filters used with the correlator have a 1000 cycle per second bandwidth, the measured rise or integration time from 10 percent to 90 percent amplitude for a pulse of sinusoidal waveform is approximaely 500 microseconds. As will be discussed more fully below this 500 microsecond time value may be substituted for the time value represented in an appropriate equation, the function of which is carried out by the subject preferred embodiment of this invention, to provide a 27 db processing gain for the system. Although said processing gain is proportional to said time value for most practical purposes, it only holds for independent samples of the input signal, and it does not hold true for integration times that are longer than 500 microseconds because the information in the reference storage and the signal deltic that are subsequently being correlated is repetitive.

The duration of the signal at the correlator output is determined by the bandwidth of the input signals and is one millisecond for the 1000 cycle per second bandwidth used. For an integration time of 500 microseconds, the signal amplitude at the filter output can rise to approximately maximum value during the first half of this one millisecond period. Since it is desirable that the signal maintain maximum amplitude during the second half of the period, a minimum phase discontinuity of the signal at the filter input with consecutive recirculations of the signals in the delay lines is required and, accordingly, are important factors to consider when choosing the center frequencies of the integration filters and the heterodyne oscillator frequency at the receiver modulator. Thus, it can readily be seen that the design choice with respect to this matter should be made such that a signal of 500 cycles per second at the inputs to the signal and reference deltics, corresponding to the center of the band, will produce a correlated output signal having no phase discontinuity. Then input signal frequencies corresponding to the extremes of the signal band will result in correlator output signals having phase discontinuities of less than 90°, and the output signal obtained with a pseudo-noise input signal will have degradation. The following relationships apply in choosing the correlator output frequencies:

$$(1) \ n = fT$$

where
n = cycles of deltic input signal between sample pulses,
f = deltic input frequency,
T = sample pulse period.
Also (2) $N = FT'$, where
N = cycles of correlator output signal for each storage recirculation,
F = correlator output frequency,
T' = length of storage delay line.
For no phase discontinuity $$(3) \ N - n = I,$$

where I is any integer. But, in the subject invention, $T = T'$, and it follows:

$$(4) \ F = (I/T) + f$$

Several other factors place limitations on reductions of integration filter bandwidth. Since the correlated signal appearing at the filter output is of limited duration, its energy is distributed according to a Sin X/X function and much of the energy falls outside of any reasonable filter bandwidth. The stability of the tuning fork oscillators associated with both the transmitter and receiver modulators must be considered. During acquisition, the existing range rate is not known precisely and an increase in the output bandwidth of the signal occurs which is proportional to the uncompensated component of the doppler. In this case, the filter bandwidth determines the accuracy with which the range rate must be known before communications can be established.

The signals appearing at the outputs of integration filters 74, 75, and 76 are respectively amplified in amplifiers 77, 78, and 79 and applied to three separate cathode ray tubes 80, 81, and 82 for visual readout thereat. In addition to being applied to said cathode ray tubes, the amplified integration filter outputs may be fed to a recording readout 83 which may be of any appropriate multi-channel or selective recording type as so desired for any given operational conditions.

Three sweep lengths are available from three sweep generators 84, 85, and 86 which are respectively triggered by a 12.5 second trigger 87, a 1.25 second trigger 88, and a .125 second trigger 89 to provide a common vertical time base and range scale on the aforementioned cathde ray tubes and recording readout. At the beginning of each sweep, a sweep range selector switch 90 and a 500 microsecond gate 91 allows the current information contained in the reference deltic to be fed into the reference storage where it recirculates. Again, assuming an initial delay in the received signal path, correlation will exist and a one millisecond pulse will appear at the output of one of the integration filters at some time during the sweep, providing the cathode ray tube time base chosen is of longer duration than the initial signal delay. This pulse produces both horizontal deflection and intensity modulation of the appropriate cathode ray tube and appears as a horizontal deflection to the right at a vertical displacement proportional to the time delay of the received signal. The displayed signal moves sequentialy among cathode ray tubes 80, 81, and 82 as the frequencies represented by reference characters A, B, and C are keyed into the transmitter modulator. Although the sweep rates may be chosen as desired without deviating from the scope and spirit of this invention, the sweep rates of the preferred embodiment herein described were chosen to respectively correspond to range increments of 10, 1, and 0.1 miles and were calibrated for a sound velocity in water of 4800 feet per second.

Mechanically, proportional resolver 14 and translation resolver 33 are connected by an appropriate gear train 92 in such manner that a single DC driving motor 93 will shift the input frequencies in the proper ratio. The armature voltage of the DC driving motor is varied by a manually operated doppler compensation motor control 94 to produce the proper resolver speed.

Since the proportional resolver controls the rate at which the pseudo random noise generator is driven, it is necessary to adjust the range indicator in order to account for the resulting cumulative time displacement of the pseudo-noise signal. This is done by obtaining the difference between the input and the outpt frequencies of the proportional resolver with a modulator 95 and a low pass filter 96. A pulse generator 97 converts this low frequency difference signal to low frequency pulses which are timely fed through contacts 98 of range set switch 16 and a doppler compensation switch 99 to a range indicator counter 100 where theyare used thereby to cause addition or subtraction to occur, depending on the setting of switch 99.

During normal operation at sea, the received signal experiences a time delay with respect to the reference signal which is proportional to the range between the communicating vessels. This delay is compensated for by removing the shift pulses driving the pseudo-noise generator at the receiving vessel for a corresponding time interval, but, when the shift pulses are again applied to the pseudo-noise generator, the signal therefrom resumes its programmed sequence and the reference signal is appropriately delayed. The length of time the shift pulses are removed is measured by the range indicator and displayed as range. Since the reference storage will compenate for maximum delays corresponding to 10, 1, or 0.1 mile range increments depending on the display range scale chosen delay is inserted at the pseudo-noise generator which is slightly less than that corresponding to true range, and the display range scale is chosen to scan from the range displayed by the range indicator out past the true range. While the true range is the sum of the indicator reading and the cathode ray tube reading, the latter will usually be only a few hundredths of a mile and may be neglected.

Delay is inserted in the pseudo-noise signal by throwing range set switch 16 to the right hand contacts (add) position. By means of contacts 15 this disconnects the 2 kc signal which controls the shift pulses at the pseudo-noise generator, and no shift pulses are generated. It simultaneously connects by means of contacts 101 signals which are derived from the same 2 kc signal and pulse shaped by a pulse generator 102 to the add bus of the range indicator counter for adding indicated mileage thereto. When the range set switch is released, the 2 kc drive is restored to the pseudo-noise generator and removed from the add bus of the range indicator. The pseudo-noise signal resumes its normal sequence and the range indicator continues to display a range corresponding to the length of time the range-set switch was depressed.

When it is desired to advance the pseudo-noise signal to reduce the delay previously inserted, the range set switch is thrown to the left hand contacts (subtract) position. This applies a 4 kc control signal, amplified by an amplifier 103, through contacts 15 to the shift pulse generator of pseudo-noise generator 17 so that the pseudo-noise sequence progresses at twice its normal rate. If the switch is held in this position for the same length of time it was held in the right hand add position and the switch is then released, the delay is eliminated and the pseudo-noise signal resumes its sequence at the same point as though it had been continuously driven at 2 kc. While the range set switch is in left hand substract position, pulses at a 2 kc rate are fed to the subtract bus of the range indicator which decreased the mileage indication thereat. Prior to transmitting, the pseudo-noise generator is reset by holding the range set switch in the subtract position until the range indicator reads zero.

Although not shown in the drawing, an alternate method of compensating for the signal time delay due to its transmission through the water employs two identical pseudo-noise generators for each secure communication system. The first of these is termed the master pseudo-noise generator and is always driven at the two kilocycle per second rate. All transmissions are made using the signal from the master pseudo-noise generator. The second pseudo-noise generator is termed the reference generator and it is also normally driven at the two kilocycle per second rate but is delayed as required for signal reception by the method described above. The amount of delay which has been inserted in the reference pseudo-noise signal may be reduced by the method described above or it may be eliminated by instantaneously setting each stage of the reference pseudo-noise generator to the same state as the corresponding stage of the master pseudo-noise generator by means of appropriate gating circuitry. When this method of compensating for the signal time delay is used and two way communication is being conducted, the vessel which has been receiving can immediately commence transmission without resetting the pseudo-noise generator, and the vessel which has been transmitting need not repeat the acquisition process each time reception is commenced since the correct time delay of the reference pseudo-noise signal may be retained after communication is initially established.

Switch 99 is ganged and operates in conjunction with a variable dial 104 which is calibrated to read range rate in accordance with proportional doppler compensation. For example, when the cathode ray tubes or recording readout indicate that the range of vessel being communicated with is increasing or decreasing, dial 104 is turned accordingly in the proper direction to stop the displayed movement or drift along the time base of the screen of said cathode ray tubes. Said dial being mechanically connected to motor control 94 causes motor 93 to change speed and thus cause resolvers 14 and 33 to likewise change speed. This results in appropriate frequency changes in the resolver outputs which, in turn, effects cathode ray tube readout to stop displayed movement on the screen thereof as mentioned above. Of course, since dial 101 and switch 99 are ganged together, the proper add or subtract pulses are supplied to range indicator counter 100 at a rate proportional to the dippler compensation to provide range information.

To illustrate how this range rate compensation and indication functions within the subject invention, assume that channel B is being keyed at the transmitter. The keying oscillator frequency is 1450 cycles per second and the 50 to 1050 cycles per second signal band at the pseudo-noise generator output is utilized to produce the transmitted signal in the 1500 to 2500 cycle per second band. The receiver signal for a 10 knot closing range rate is $1500+5.25=1505.25$ to $2500+8.75=2508.75$ cycles per second. At the receiver modulator, the signal is translated downward by 1433.5 cycles per second if no compensation is inserted by the translation resolver. The resulting signal extends from 71.75 cycles per second to 1075.25 cycles per second. At the extremes of the band, the difference between corresponding frequency components of these two signals is 21.750 cycles per second and 25.250 cycles per second. Since channel B is being keyed, these difference frequencies should both be 16.5 cycles per second so that the correlated signal after deltic processing will be centered in the channel B integration filter. The amount of translation required is relative to the keying oscillator frequency so that 0.35 percent of $1450=5.075$ cycles per second. This is added by the translation resolver to the receiver local oscillator frequency to produce a net output frequency of 1438.575 cycles per second. When the received signal is translated down by this amount, it extends from 66.675 to 1070.175 cycles per second. When compared with the reference signal, the difference frequencies appearing at the signal and reference deltic inputs then fall into the band from 16.675 to 20.175 cycles per second. In order to obtain a constant difference frequency for corresponding signal frequency components, the 2 kc rate at which the pseudo-noise generator is normally driven is increased 0.35 percent by the proportional resolver, and, since the reference pseudo-noise signal sequence is speeded up by 0.35 percent, the frequency components are correspondingly higher. Those which correlate with the received signal now have a spectrum of 50.175 to 1053.675 cycles per second. When this compensated reference signal is compared with the compensated received signal, the difference between corresponding frequency components is 16.500 cycles per second at each point in the band. Thus, a sinusoidal signal is produced at the correlator output which is centered in the appropriate integraton filter. It may, therefore, be seen that although compensation for 10 knot range rate may be accomplished, the signal at the correlator for no compensation will not be passed by any of the integration filters. Or, unitl compensated, the signal may appear on an adjacent cathode ray tube of the readout display or on more than one cathode ray tube, depending upon the amount of doppler. The spectrum of the signal for this condition is sufficiently wide that it is not lost between channels. Once the signal is seen, manual compensation control dial 98 is adjusted to move the signal to the center channel and to stop its drift along the time base. The range rate may then be read from the calibrated doppler compensation control scale at control dial 98.

With respect to the friend or foe identification aspects of the subject invention, communication between submarines may take place substantially without fear of compromise even though any given enemy has duplicate equipment. This is due to the fact that for a signal to appear at the correlator output, the received signal must contain a time series identical to that of the reference pseudo-noise generator. To duplicate this series, a generator must be employed which contains the same number of stages and has the same feedback arrangement, and it must be driven at the same rate and started nearly synchronously with the local generator. Thus, several techniques may be used to avoid detection as a result of signal sample analysis. The pseudo-noise generators may be recycled according to a time schedule, the feedback network may be rearranged according to a time schedule, a non-linear mixing matrix may be used to "scramble" the outputs from several stages of the noise generator, or a noncoherent signal may be mixed with the pseudo-noise signal before transmission.

Reviewing now the aforementioned sample pulse generator in greater detail, clock generator 55 produces a delayed clock pulse (DCP) which is fed to the coincidence gates of the signal, reference, and reference storage deltics for timely actuating same. In addition, clock generator 55 produces a clock pulse (CP) of the same frequency as the aforesaid delayed clock pulse but preceding it in time. This clock pulse is applied to coincidence gate 56 where it provides for retiming and reshaping of the sample pulse (SP). The reshaped sample pulse is fed through pulse amplifier 57, the output of which triggers blocking oscillator 58. This blocking oscillator has a natural period slightly longer than the 500 microsecond sample pulse period, so that if there is no sample pulse present, one will be generated by the blocking oscillator. And if more than one sample pulse is present during the 500 microsecond interval, the natural period of the blocking oscillator will prevent the recirculation of more than one sample pulse. The sample pulse from the blocking oscillator is applied to modulator oscillator 59 and fed through a 500 microsecond acoustic delay line 60, after which it is amplified by amplifier 61 and again applied to coincidence gate 56 for retiming and reshaping by the clock pulse.

The sample pulse from the blocking oscillator is also applied the the coincidence gates of the signal and reference deltics where its presence permits the gating of new information into the deltics. In addition, the sample pulse from the blocking oscillator is passed through the inverter circuit associated therewith where it changed to an inhibit or inverted sample pulse (ISP). This inverted sample pulse acts as an inhibiting pulse, synchronous with the sample pulse, which is applied to the coincidence gates of the signal and reference deltics where it prevents recirculation of the oldest bit of information contained in each of said deltics at the time new information is being gated into same by the sample pulse.

Figure 3:
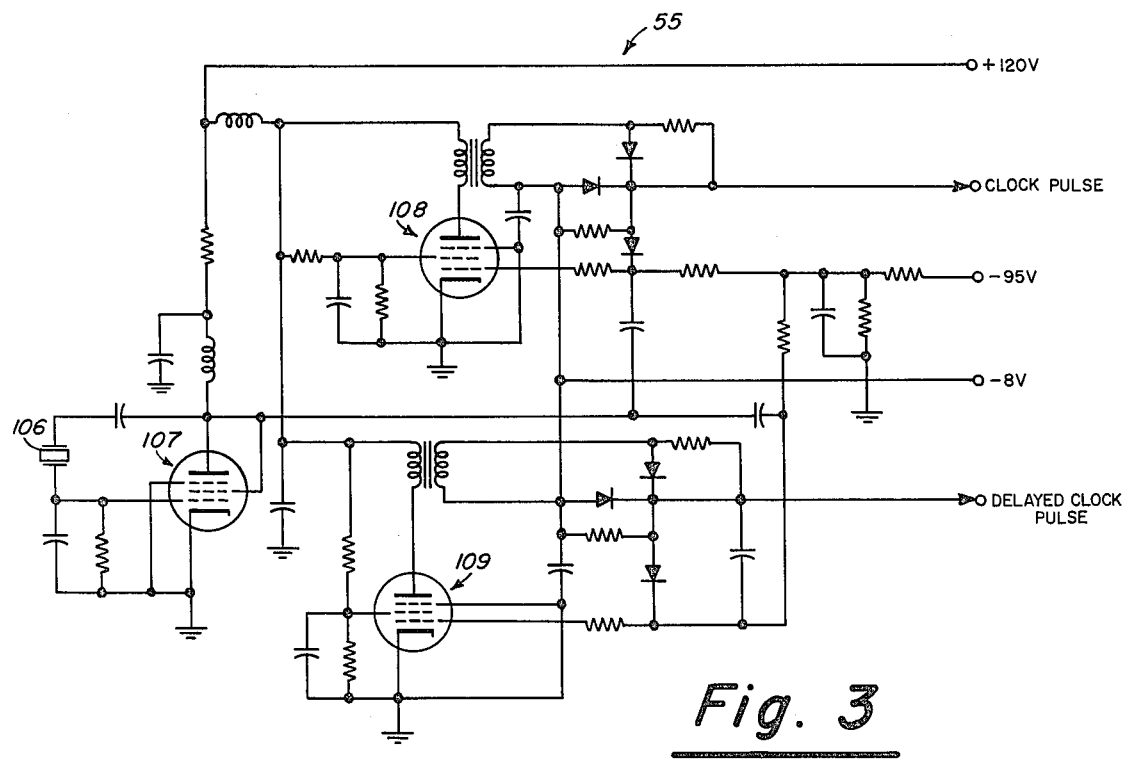
FIG. 3 is a detailed schematic diagram of the clock generator employed in this invention.

Referring now to FIG. 3, clock generator 55 of the sample pulse generator is shown in detail as including a two megacycle crystal 106 operating in conjunction with a pentode stage 107 to produce an output signal which is simultaneously coupled to a pentode amplifier stage 108 and a pentode stage 109. Stages 108 and 109 respectively produce the aforementioned clock pulse and delayed clock pulse, and these outputs, in turn, are appropriately applied to coincidence gate 56 of the sample pulse generator 54, coincidence gate 37 of signal deltic 36, coincidence gate 43 of reference deltic 42, and coincidence gate 49 of reference storage deltic 48.

Figure 4:
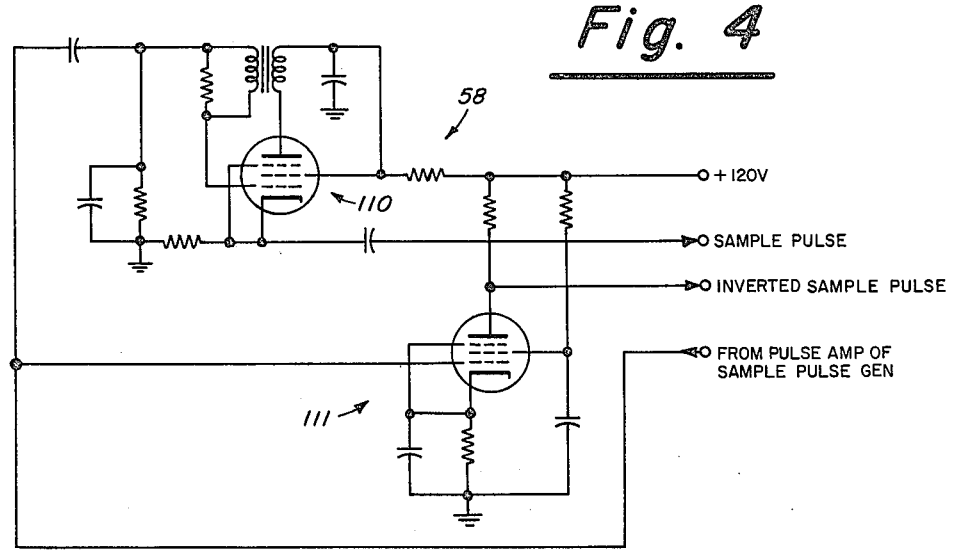
FIG. 4 is a detailed schematic diagram of the specific blocking oscillator and pulse inverter circuits used in this invention.

FIG. 4 illustrates the detail components of blocking oscillator and invertor 58 and shows a pentode blocking oscillator stage 110 and a pentode pulse inverter stage 111 which simultaneously receive the amplified pulse from pulse amplifier 57 of sample pulse generator 54. The sample pulse outputs from the blocking oscillator stage are applied as input signals to modulator oscillator 59 and the inverted sample pulse outputs are applied as trigger inputs to the signal and reference deltics.

Briefly and generally speaking, the secure sonar communication system constituting this invention operates as follows:

When transmitting, the precision master clock oscillator drives the pseudo-noise generator which generates a pseudo random noise signal by means of a digital shift register. This signal can be duplicated by the receiver at the remote submarine station. But, in the transmitter, the pseudo-noise signal is passed through a low pass filter having an appropriate cutoff frequency and is applied to one input of the balanced modulator. The second input to this modulator is derived from one of three heterodyne keying oscillators. The upper side band is chosen at the modulator output by an appropriate band pass filter, after which it is amplified and subsequently transmitted as an acoustic signal through the water by the directional or omnidirectional transducer array.

During reception, the acoustic signal is received by the transducer and fed through the bandpass filter to the receiver balanced modulator where it is modulated by another signal of predetermined frequency supplied by the local oscillator. The low pass filter selects the lower sideband output from the modulator, and by a sampling process, the signal deltic converts this lower sideband to digital form, compresses it in time by a predetermined factor, and feeds it as one input to the correlator.

The second input to the correlator originates at the pseudo-noise generator in the receiving vessel which is likewise driven by its master clock oscillator. Normally, the pseudo-noise generator at the receiving vessel is as nearly synchronous with the pseudo-noise generator at the transmitting vessel as the inherent stability of the driving oscillators will permit. The reference pseudo-noise signal is processed by the reference deltic which is identical with the signal deltic. Periodically, a group of samples from the reference deltic are gated into the reference storage circuit which recirculates them until a new group is passed through the gate. The output from the reference storage circuit continuously feeds these recirculating samples to the second input of the correlator.

In the presently disclosed preferred embodiment the storage circuit has a capacity of 1000 binary digits stored in the 500 microsecond delay line. Also, in the preferred embodiment, the signal and reference deltics each contain 999 digits in their 499.5 microsecond delay lines. It should be understood, however, that the numerical values presently used throughout the entire disclosure of this invention are by way of example only and may be changed as necessary to provide proper design for any given set of operational conditions without violating the scope and spirit of the invention.

The reference storage and the signal and reference deltics are driven by common clock pulses from the 2 megacycle clock generator. At each recirculation of the samples in the storage line, these samples are correlated with a similar group of samples from the signal deltic which is advanced in time by one digit, or 0.5 microsecond, relative to the preceding recirculation period. Since a new sample of the received signal replaces the oldest digit in the signal deltic each 500 microseconds, the incoming signal is continuously compared with the stored reference by the correlator. This scanning of the received signal is thus accomplished in real time.

To compensate for the delay, t, experienced by the signal in transmission through the water, it is necessary to delay the stored reference signal by an amount equal to t to produce a signal at the correlator output. Most of this delay is introduced by temporarily stopping the reference pseudo-noise generator; the remainder is introduced by the deltic scanning process. At first the reference pseudo-noise generator is stopped for an interval $t - \Delta t$ and then allowed to continue its normal sequence delayed in time. The amount of time delay $t - \Delta t$ is computed and displayed in the form of nautical miles by the range indicator. The delayed reference pseudo-noise signal is processed by the reference deltic and 1000 samples are gated into the storage at any time $t_1$. If the transmitter is being keyed with frequency $f_2$ a signal frequency $(f_2 - f_0) = 16.5$ kc will appear at the correlator output at time $t_1 + \Delta t$. At time $t_1$ a linear vertical sweep is initiated on the cathode ray tubes. The correlator output signal is applied to the horizontal axis of the cathode ray tubes after passing through the appropriate integration centered at 16.5 kc. The signal appears as a horizontal deflection on the corresponding cathode ray tube at a vertical displacement proportional to $\Delta t$. At the time $t_2$, a new group of samples is gated into the reference storage, simultaneously with the start of a new trace on the cathode ray tube, and a $t_2 + \Delta t$ time the signal can again be observed.

Before initial contact, the range between communicating vessels, and therefore t, is usually not accurately known. Allowance for range uncertainty is made by stopping the reference pseudo-noise generator for an interval less than time t and by choosing a cathode ray tube sweep duration longer than $\Delta t$. Once contact is made, the range can be accurately read. The amount of time delay inserted at the reference pseudo-noise generator can be removed by driving the generator at twice its normal rate for a period of time equal to t. The averging time of each correlator output filter is equal to the storage time of the reference storage, or 500 microseconds. Since the signal bandwidth at the correlator input is 1000 kc, the theoretical processing gain is approximately:

Processing Gain$_{db}$ = 10 log T$\Delta$f = 10 log (500×10$^{-6}$ × 10$^6$) = 27 db Where: T = Averging time in seconds, $\Delta$ f = Bandwidth in cycles per second.

The time required to replace all the information contained in the deltics is 0.5 second. Inasmuch as the gate between the reference deltic and the reference storage at the receiver is not synchronized with the keying of the transmitter, the maximum keying rate may be limited to one character per second to ensure complete correlation of the signal for each character. If, for example, a message consists of ten characters, the transmission time is ten seconds per message and the number of different messages possible is approximately 60,000. Ostensively, this number of messages is sufficient for the transfer of tactical information and many other types of information for all practical purposes.

It should be understood, of course, that the foregoing disclosure relates only to the preferred embodiment of the invention and that numerous modifications or alterations may be made therein without departing from the spirit and scope of the invention as set forth in the appended claims.

What is claimed is:

1. A secure sonar communication system for transmitting and receiving intelligence signals within an aqueous medium comprising in combination means for generating an electrical pseudo random noise signal within a predetermined bandwidth, means connected to said pseudo random noise generating means for selectively driving same at one of a plurality of predetermined frequencies, keying oscillator means adapted to selectively produce an output of one of a plurality of predetermined frequency signals, a balanced modulator means coupled to said pseudo random noise signal generating means and said keying oscillator means for mixing the output signals therefrom, bandpass filter means connected to the output of said balanced modulator means for passing the upper sideband thereof, means for receiving an electrical pseudo random noise signal, transducer means, said transducer means being capable of broadcasting acoustical energy upon excitation by the upper sideband from the aforesaid bandpass filter means and in proportion thereto and for producing an electrical pseudo random noise output signal in proportion to a received acoustical pseudo random noise signal, and means connected to the output of said bandpass filter means and the input of said electrical pseudo random noise signal receiving means for selectively connecting same to said transducer means during broadcasting and receiving operations respectively.

2. A secure sonar communication system for transmitting and receiving intelligence signals within an aqueous medium comprising in combination, means for generating a plurality of electrical pseudo-noise signals within a plurality of predetermined bandwidths respectively, a balanced receiver modulator, a receiver oscillator coupled to said balanced receiver modulator for supplying a carrier signal of predetermined frequency thereto, low-pass filter means connected to the output of said receiver modulator, a signal deltic coupled to the output of said low-pass filter, a reference deltic coupled to the output of said means for generating a plurality of electrical pseudo-noise signals respectively within a plurality of predetermined bandwidths, a gate connected to the output of said reference deltic, a reference storage connected to the output of said gate, a correlator connected to the outputs of said signal deltic and said reference deltic, integration filter means coupled to the output of said correlator, means connected to the output of said integration filter means for reading out the intelligence received therefrom, means connected between said gate and said readout means for synchronizing same, reversible transducer means, and switch means for selectively connecting said transducer means to the output of said electrical pseudo-noise signal generating means and to the input of the aforesaid balanced receiver modulator as desired during intelligence signal transmission and reception respectively.

3. A sonar system for providing communication between vessels remotely disposed within an aqueous medium comprising in combination means for generating a pseudo-noise signal, master clock means connected to said pseudo-noise signal generating means for selectively driving means same at one of a plurality of predetermined frequencies, a keying oscillator adapted to selectively produce one of a plurality of predetermined frequency signals, a transmit modulator connected to the outputs of said pseudo-noise generating means and said keying oscillator for modulating said keying oscillator output signal by said pseudo-noise signal, a bandpass filter coupled to the output of said transmit modulator for passing the upper sideband thereof, a receiver oscillator means adapted to produce an output signal of given frequency, a receiver modulator coupled to said receiver oscillator for response to said output signal of given frequency as a first input thereto and adapted to receive an intelligence signal as a second input thereto, whereby said given frequency and intelligence signals are mixed to produce a plurality of output signals, lowpass filter means coupled to the output of said receiver modulator for selecting the lower sideband from said plurality of output signals, signal deltic means connected to said low-pass filter for converting said lower sideband to compressed digital form by timely sampling same, reference deltic means connected to the output of said pseudo-noise signal generating means for likewise converting the output signals therefrom to compressed digital form by timely sampling same, correlator means connected to the outputs of said signal and reference deltic means for comparing same and producing an output signal proportional to the phase relationship therebetween, integration filter means connected to the output of said correlator means for passing said correlator means output signals, means coupled to the output of said integration filter means for reading out and recording the signals passed thereby in terms of desired navigation and communication parameters, transducer means, said transducer means being adapted to broadcast acoustical energy upon excitation by electrical energy and to produce electrical energy upon excitation by received acoustical energy, and means connected to said transducer means for selectively connecting same to the output of said upper sideband filter and to the aforesaid receiver modulator during conditions of transmission and reception respectively.

4. The device of claim 3 wherein said transducer means includes a transducer array for transmitting and receiving energy at a direction in accordance with a predetermined radiation pattern.

5. The device of claim 3 wherein said transducer means includes an omnidirectional hydrophone array.

6. The device of claim 3 wherein said transducer means includes a unidirectional electroacoustical projector adapted for operation within an aqueous medium.

7. The device of claim 3 further characterized by the inclusion of means connected between the outputs of said master clock and receiver oscillator means and the input of said receiver modulator for adjustable coordination thereat.

8. In a secure sonar communication system, transducer means for converting received acoustical energy into an electrical output signal, a local oscillator means for producing an output signal of predetermined frequency, means connected to said transducer and local oscillator means for heterodyning the output signals thereof, means coupled to the output of heterodyning means for selecting and passing the lower sideband therefrom, a first means connected to the last mentioned means for sampling and converting the appropriate output thereof to time compressed digital form, means for generating a pseudo-noise signal representing an intelligence signal, said pseudo-noise signal generating means being adapted for storing programmed pseudo-noise intelligence signals and for timely and selectively broadcasting and rebroadcasting same in synchronization with similarly programmed pseudo-noise signals generated by a remotely disposed generating means, a second means connected to the output of said pseudo-noise signal generating means for sampling and converting same to time compressed digital form, means coupled of said last mentioned means for gating said time compressed digitally formed samples into groups capable of being timely recirculated, storage means connected to said gating means for recirculating the output sample groups thereof until a new group is passed thereby, means connected to the outputs of said first sampling and converting means and the aforesaid storage means for correlating same, readout means fo displaying and recording the output thereof in accordance with predetermined parameters, integration filter means interconnecting the output of said correlating means and the input of said readout means, and means connected between said gating means and said readout means for synchronizing same.

9. The device of claim 8 wherein said means for gating said time compressed digitally formed samples into groups capable of being timely recirculated includes a clock generator adapted for producing a clock pulse and a delayed clock pulse, an AND gate connected to the output of said clock generator for response to said clock pulse, a blocking oscillator and inverter connected to the output and said AND gate and adapted to produce a sample pulse and an inverted clock pulse, a modulator oscillator means connected to the output of said blocking oscillator and inverter for response to said sample pulse, acoustic delay line means connected to the output of said modulator oscillator, and means interconnecting the output of said acoustic delay line means and an input of the aforesaid AND gate for timely gating same, whereby the delayed clock pulse and the inverted clock pulse may be applied as appropriate inputs to said first and second means for sampling and converting outputs to time compressed digital form and to the aforesaid storage means respectively.

10. A sonar system for transmitting and receiving intelligence signals between vessels remotely disposed within an aqueous medium comprising in combination a pseudo random noise generator, said pseudo random noise generator being capable of including programmed storage of intelligence signals and adapted for selectively, timely, and repetitively broadcasting same as output signals therefrom, a master clock driving said pseudo random noise generator, a keying oscillator, a transmit modulator connected to the outputs of said pseudo random noise generator and said keying oscillator, a bandpass filter coupled to the output of said transmit modulator, a receiver oscillator, a receiver modulator coupled to the output of said receiver oscillator, low-pass filter means connected to the output of said receiver modulator, a signal deltic coupled to the output of said low-pass filter, a reference deltic coupled to the output of said pseudo random noise generator, a gate connected to the output of said reference deltic, a reference storage connected to the output of said gate, a correlator connected to the outputs of said signal deltic and said reference storage, a plurality of integration filters coupled to the output of said correlator, means connected to the output of each of said plurality of integration filters for reading out the information received therefrom, reversible transducer means, and switch means for selectively connecting said transducer means to the output of said bandpass filter and to the aforesaid receiver modulator as desired during intelligence signal transmission and reception respectively.

11. A secure sonar communication system comprising in combination means for generating an electrical pseudo-noise signal, means for receiving an electrical pseudo-noise signal, a transducer adapted for transmitting acoustical energy in proportion to said electrical pseudo-noise signal upon excitation thereby and producing an electrical pseudo-noise signal in proportion to and upon excitation by received acoustical energy, switch means connected to the output of said electrical pseudo-noise signal generating means and to the input of said electrical pseudo-noise signal receiving means for selectively connecting said transducer thereto, means connected to said electrical pseudo-noise signal receiving means adapted for coordinating the signals received thereby with similar signals generated by said electrical pseudo-noise generating means, and readout means connected to the outputs of said signal coordination means for recording and displaying the output therefrom in terms of predetermined navigation and ommunication parameters, said means connected to said electrical pseudo-noise receiving means for coordinating the signals received thereby with similar signals generated by said electrical pseudo-noise signal generating means includes a signal deltic and a reference deltic connected to the outputs of said receiving and generating means respectively, a correlator coupled to the outputs of said signal and reference deltics for comparing the signal phase relationship therebetween, and a plurality of bandpass integration filters interconnecting the output of said correlator and the inputs of the aforesaid readout means for recording and indicating said navigation and communication parameters on the appropriate scale thereof.

* * * * *